Feb. 2, 1971  J. EICHHORN ET AL  3,560,227
HIGH BARRIER COATED PAPERS COMPRISING A FILM OF A RESINOUS
POLYOLEFIN AND RESINOUS BARRIER LAYER WHICH IS ADHERED
TO A PAPER SUBSTRATE THROUGH AN OLEFIN ADHESION
PROMOTING LAYER
Filed Jan. 17, 1968
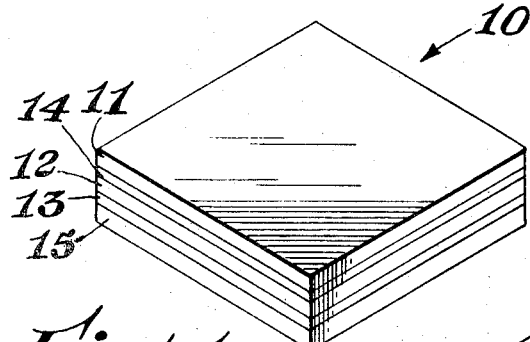
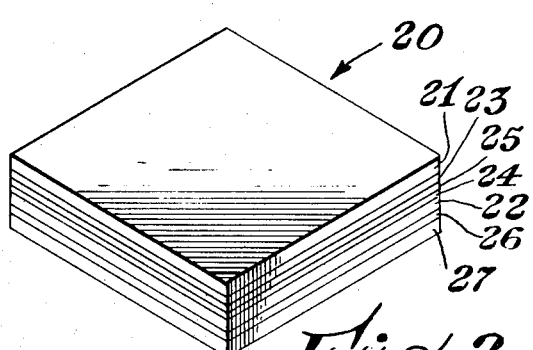
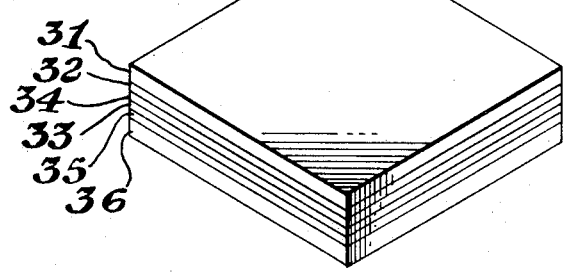
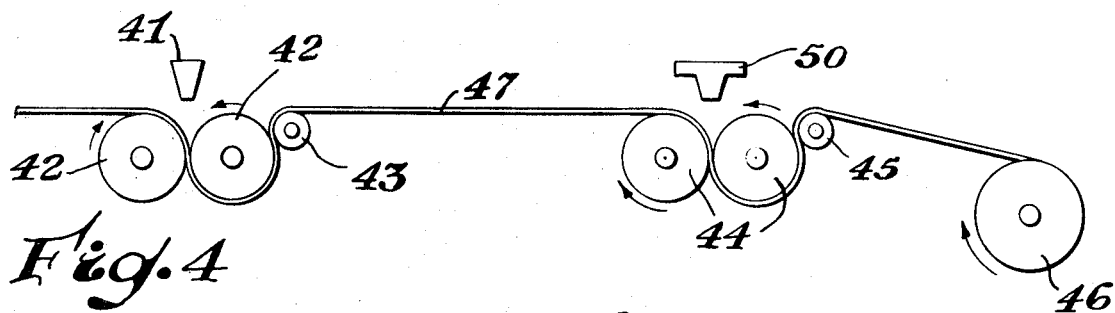
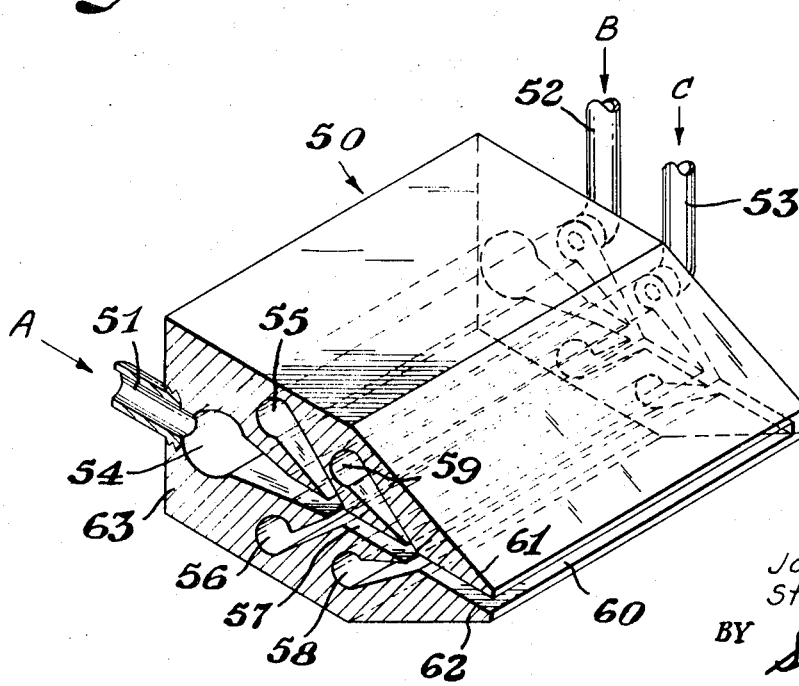
INVENTORS.
Jacob Eichhorn
Stanley F. Roth
BY Sidney J. Walker
ATTORNEY United States Patent Office 3,560,227
Patented Feb. 2, 1971

3,560,227
HIGH BARRIER COATED PAPERS COMPRISING A FILM OF RESINOUS POLYOLEFIN AND RESINOUS BARRIER LAYER WHICH IS ADHERED TO A PAPER SUBSTRATE THROUGH AN OLEFIN ADHESION PROMOTING LAYER
Jacob Eichhorn and Stanley F. Roth, Midland, Mich., assignors to The Dow Chemical Company, Midland, Mich., a corporation of Delaware
Filed Jan. 17, 1968, Ser. No. 698,613
Int. Cl. B32b 27/08, 27/10
U.S. Cl. 99—171       16 Claims

ABSTRACT OF THE DISCLOSURE

A new and useful high barrier film is described along with a method for its preparation. A layered polyolefin-halohydrocarbon melt is directly extruded onto a pretreated paper substrate to obtain a novel high barrier coated paper.

BACKGROUND OF THE INVENTION

Field of the invention

This invention relates to the manufacture of high barrier coated webs prepared by direct extrusion.

Description of the prior art

Barrier coated papers have been produced commercially by coating with polyvinylidene chloride resins. However, the finished product is not entirely satisfactory as these coatings are susceptible to cracking when creased, and heat sealing to the saran surface is difficult. Lamination of saran film to paper has been done for specialized use such as cap liners. It is not commercially attractive, however, for uses such as pouch paper, bags and cartons.

SUMMARY OF THE INVENTION

This invention overcomes the limitations of the previous methods by a novel process which produces a new and useful high barrier coated paper. This is accomplished by the direct extrusion of a layered polyolefin-saran melt onto a properly pretreated paper stock. The resultant product is an excellent gas and moisture barrier, has excellent crease resistance, and will seal readily to a variety of substrates.

An object of the present invention is to provide a composition of matter containing a coextruded multi-layered high barrier film firmly united to a paper substrate. Another object is to provide a novel method for the preparation of multi-layered high barrier coated papers. A further object is to manufacture high barrier papers at coating speeds substantially higher than those obtainable by adhesive lamination. Other objects of the invention will appear in the following description and claims, reference being had to the accompanying drawings forming a part of this specification.

BRIEF DESCRIPTION OF THE DRAWINGS

Preferred embodiments of the invention are shown in the drawings wherein:

FIG. 1 is an exaggerated isometric view of a sheet of high barrier coated paper in accordance with the invention.

FIG. 2 is an exaggerated isometric view of an alternate embodiment of the invention.

FIG. 3 is an exaggerated isometric view of yet another embodiment of the invention.

FIG. 4 is a block flow diagram of the process of this invention.

FIG. 5 is a schematic representation of an apparatus for the preparation of the multi-layer high barrier film.

DESCRIPTION OF THE PREFERRED EMBODIMENTS

Looking now with more particularity at the drawings, FIG. 1 illustrates a coated paper generally designated by the reference numeral 10. The coated paper 10 comprises a first outer polyolefin layer 11, a second polyolefin layer 12, a centrally disposed layer 14 consisting of a barrier polymer such as a halocarbon or a halohydrocarbon. These layers are securely attached to each other and layer 12 is in turn securely attached to a third polyolefin layer 13 which in turn is securely attached to paper substrate 15.

In FIG. 2 is illustrated a view of another coated paper generally designated by the reference numeral 20. The coated paper 20 comprises a first outer layer 21, a second layer 22 of a polyolefin material, a third layer 25 of an oxygen and moisture vapor barrier and bonding layers 23 and 24. The bonding layers 23 and 24 are of an adhesive material which secures the layer 21 to layer 25 and the layer 22 to the layer 25, respectively. Layer 22 is securely attached to polyolefin layer 26 which in turn is securely attached to paper substrate 27.

FIG. 3 illustrates a view of another coated paper generally designated by the reference numeral 30. The coated paper 30 comprises outer polyolefin layer 31, bonding layer 32, a barrier layer 34, a second bonding layer 33, the precoat layer of polyolefinic material 35 and the paper substrate 36.

FIG. 4 is a block flow diagram of the process of the invention wherein 50 designates an extruder particularly adapted to prepare multi-layered products such as the 11–14–12 portion of film 10 of FIG. 1, the 21–23–25–24–22 portion of film 20 of FIG. 2, the 31–32–34–33 portion of film 30 of FIG. 3. A source of heat plastified thermoplastic material is designated as 41 which coats the paper substrate prior to the layered film being extruded thereon by extruder 50. Reference numerals 42 and 44 represent conventional nip rollers, 43 and 45 are stripping rolls, while 46 represents a conventional take-up roll. Reference numeral 47 is the paper substrate.

FIG. 5 is a sectional view of an apparatus generally designated by the reference numeral 50. The apparatus 50 comprises in cooperative combination a die or facing body 63 having defined thereat a first elongated passageway 54. The passageway 54 is in cooperative communication with a source of heat-plastified thermoplastic material 51. The direction of flow is indicated by the arrow and the material identified by the letter A. The die 63 also defines internal cavities 55 and 56 which are generally commensurate in width with the passageway 54. The cavities 55 and 56 are in communication with a heat-plastified polymer source 52 which is so constructed and arranged so as to provide heat-plastified thermoplastic material to the cavities 55 and 56. The flow material is indicated by the arrow and the material is identified by the letter B. The die 63 defines fourth and fifth internal passageways 58 and 59 which extend within the die body 63 and are generally coextensive in width with the cavity 54. The cavities 58 and 59 are in operative communication with a third source 53 of a heat-plastified polyolefinic material. The direction of flow is indicated by the arrow and the material by the letter C. The cavities 54, 55, 56, 58 and 59 connect with a sixth common passage 57 extending for the width generally commensurate with the cavity 54. The cavity 57 terminates remote from the cavity at the die lips 61 and 62 which defines an extrusion slot 60.

In the preparation of a high barrier coated paper in accordance with the present invention, the paper substrate is first precoated with a layer of polyethylene and then separately extruding onto this precoat, a layered melt having a polyolefin as its outer layers and halohydrocarbon or halocarbons as inner layers. Other useful precoating materials are interpolymers of ethylene and ethyl acrylate, isobutyl acrylate, vinyl-acetate, acrylic acid and the like. These can all be appied by conventional extrusion processes. In addition, other polyolefinic materials such as blends of ethylene interpolymers with various waxes and resinous materials commonly referred to as "hot melts" or "hot melt blends" can also be used as pre-coats. In this case, processes other than extrusion would be preferred application methods. These include curtain coating, roll-coating, knife coating, and the like. The "hot melts" or "hot melt blends" referred to are of the variety listed in Moderate Packaging, October 1964 and November 1965. These "hot melts" or "hot melt blends" are mostly blends of paraffin with ethylene copolymers. Other waxes may be used. Some also contain micro waxes and/or low molecular weight resin tackifiers. Amount of comonomer runs from about 17 to 24 weight percent with a 28 weight percent vinyl acetate providing the best balance of toughness, flexibility, adhesion and barrier properties. Higher vinyl acetate content results in too limited compatibility with waxes. 18 weight percent vinyl acetate gives more transparent coatings with good hardness and scuff resistnace but are not as tough. When flexibility and heat-seal characteristics are required, a copolymer content of 20 to 30 weight percent is indicated. Other hot melts employ ethyl acrylate comonomers on the order of 20 to 30 weight percent and isobutyl acrylate comonomers on the order of 20 to 30 weight percent. Other hot melts employ blends of the various polymers enumerated above with wax. Examples of other hot melts and polymer blends used in hot melts are found in U.S. Pat. No. 3,182,101, U.S. Pat. No. 3,197,426, U.S. Pat. No. 3,201,374, U.S. No. 3,205,186, U.S. Pat. No. 3,215,678 and U.S. Pat. No. 3,249,570. Hot melt compounds used in accodance with the present invention generally have application temperatures of no higher than 400° F. and viscosities below 30,000 centipoises.

Temperatures in excess of 550° F. are required to bond polyethylene to the paper substrate. To attempt to bond the layered melt directly at such temperature would result in degradation of the halohydrocarbon or halocarbon inner core. Accordingly, the layered melt is extruded subsequently onto the coated paper at a maximum temperature of 420° F.

By proper choice of pretreat material, an excellent bond is achieved between the paper and the layered melt. A great flexibility is attained in the choice of layer sequences. Thus, in accordance with the preferred embodiment of the invention as shown in FIG. 3, a novel product is obtained through the use of our process, the like of which is otherwise not obtainable in a commercial way. The film which is extruded from apparatus 50 to produce novel product 30 comprises a layer sequence of a "tacky" polymer such as ethylene-vinyl acetate (EVA), saran, EVA, and polyethylene (PE). This unsymmetrical layered film tightly adheres to the precoated paper substrate through its outer EVA layer. The outer polyethylene layer provides excellent abrasion resistance, gloss, clarity and printability while the barrier layer of saran provides high oxygen, carbon dioxide and moisture vapor barrier characteristics. The ethylene-vinyl acetate provides an excellent adhering layer between the barrier layer and the polyethylene layer and also between the barrier layer and the coated paper substrate. An unsymmetrical film of such a layer sequence (EVA/saran/EVA/PE) would block when wound as a roll. This invention precludes this difficulty. Moreover, our method permits the use of low coating weights which would be difficult, if not impossible, to achieve by laminating an unsupported layered film to a paper substrate. Further, extrusion coating speeds are attained (1000 ft./min.) which are substantially above those commercially used for lamination (200–400 ft./min.).

By the term "polyolefin" is meant polyethylene, polypropylene, resinous copolymers of ethylene, and/or propylene with minor proportions of olefinically unsaturated monomers such as, for example, those alpha-olefins having from 2 to 8 carbon atoms such as 1-butene, 1-pentene, 1-hexene, 1-heptene, 1-octene and mixed higher alpha-olefins. Other hydrocarbons useful for making copolymers with ethylene and propylene include divinylbenzene, allene, dimethallyl and isopentene. Comonomers which can broadly be used include esters such as vinyl butyrate, vinyl acetate and methyl acrylate, acrylic acid, monosubstituted ethylene such as 1-pentene, vinylcyclohexene, allyl benzene, $C_8$–$C_{14}$ mixed alpha olefins, styrene, allyl naphthalene, and the like, 1,1-disubstituted ethylenes such as alpha-methyl styrene, 2-methylbutene-1, mixed alpha- and beta-pinenes, camphene and the like, 1,2-disubstituted ethylenes such as indene, acenaphthylene, cyclopentene, norbornylene, cyclohexene, trans-stilbene, 2-pentene and the like, conjugated dienes and trienes such as pentadiene-1,3, 1,2-dihydrobenzene, allo-ocimene and cyclopentadiene, unconjugated dienes such as mixed octadienes, hexadiene-1,5, 2,5-dimethylhexadiene-1,5, 1,4-dihydrobenzene, bicycloheptadiene, bicyclopentadiene, 4-vinylcyclohexene-1, and 4,7-diphenyl decadiene-1,9-acetylenes such as isopropenyl acetylene and phenyl acetylene, chloroolefins such as beta-methallyl chloride and chloromethyl norbornylene, and m-chlorostyrene, ethers and epoxides, and nitrogen compounds such as vinyl carbazole, 4-vinyl pyridine and acrylonitrile, and mixtures and blends thereof.

Products in accordance with the present invention are readily prepared in accordance with the method of the invention which comprises heat plastifying a polyolefinic material and coating it in thin film form onto paper stock. Thereafter, a core-forming barrier polymer as hereinafter described is heat-plastified, a polyolefin material is heat-plastified and while they are in the heat-plastified condition, they are deformed so as to form a layer of polyolefin resin disposed generally about the barrier polymer and extruded as a film onto the coated paper stock. This film comprises at least one inner or central layer having first and second major surfaces and first and second outer layers adhered to the major surfaces of the central layer, the central layer being a barrier material, the surface layers comprising a polyolefinic material. It is to be understood that films of varying numbers and layers are readily produced which may be either symmetrical or unsymmetrical wherein the barrier layer is of single or multiple layer construction. If a thermoplastic resinous material is supplied from the source of thermoplastic resinous material 51, 52 or 53, a single layer film will issue from the extrusion orifice 60. Thermoplastic material is supplied from the sources A and B or A and C or B and C. A three-layer film will result having the arrangement of polymer BAB, CAC or CBC. Alternately, a five-layer film is prepared when thermoplastic resinous material is supplied from all three sources. The resultant film has the arrangement of CBABC. If the source B is connected only to the cavity 56 and not to the cavity 55, the resulting combination is CABC. When only cavity 58 is connected to source C, the resultant product has the combination of BABC, for example, the film previously described as comprising EVA/saran/EVA/PE.

Advantageously, in producing a five-layered film, the barrier material is introduced from the polymer source A and the polyolefin material introduced from source C. Beneficially, for certain instances it is critical to increase the peel strength of the resultant layered film and beneficially the polymer from source B is an adhesion-promoting material which adheres strongly to material A and material C. Barrier film in accordance with the present invention beneficially employ a centrally disposed barrier layer of low permeability such as saran materials which contain at least 80 percent vinylidene chloride copolymerized therein and beneficially 85 percent and even 90 weight percent. Such saran resins are of a high crystalline variety and exhibit excellent barrier properties. Other barrier materials which are eminently satisfactory are hydrocarbons containing fluorine and chlorine such as polytetrafluorene, polychlorotrifluoroethylene and copolymers containing major portions of the hydrocarbons containing fluorine and chlorine. Polyvinyl chloride, polyester and nylon resins are also satisfactory in many instances as barrier layers. However, for optimum barrier characteristics, saran and fluorocarbons and fluorochlorocarbons are generally unsurpassed.

Beneficially in certain instances, it is desirable to add adhesive or bonding layers between the barrier layer and the outer polyolefin layer. A variety of polymers may be employed for the purpose and coextruded simultaneously as the film is formed to provide five-layer film, wherein the outer layers are of a polyolefin layer, such as polyethylene polypropylene and the resinous copolymers of ethylene and propylene. In the instance of adhering layers of polyolefins such as polyethylene and polypropylene to vinylidene chloride polymers, polymers which are particularly advantageous are copolymers from about 13 weight percent to about 35 weight percent vinyl acetate with from about 87 weight percent to about 65 weight percent ethylene, copolymers of from about 20 to 30 weight percent ethyl acrylate with from about 80 to 70 weight percent ethylene, copolymers from about 20 to 30 weight percent isobutyl acrylate with from about 80 to 70 weight percent of ethylene and chlorinated polyethylene containing from about 25 to 40 weight percent chlorine.

Beneficial and advantageous thermoplastic resinous films in accordance with the present invention are employed having thicknesses from about one-half to about 20 mils. However, the barrier layer should have a thickness of from about $5 \times 10^{-5}$ to $1 \times 10^{-3}$ inches.

The substrate is any paper or paper board. Although the examples hereinafter shown use kraft paper, other paper or paper boards can also be used. Such other papers or paper boards include milk carton stock, glassine paper, sulfite paper, greaseproof paper, parchment and the like.

Plasticizers and heat stabilizers are frequently employed in the barrier layer. Also where an adhesive layer is used to bond the polyolefin to the halohydrocarbon, a suitable ultraviolet light absorbing stabilizer may be incorporated in the adhesive composition to provide a sufficient screening of the vinylidene chloride or halohydrocarbon layer from ultraviolet light while avoiding the necessity of incorporating significantly larger amounts of the stabilizer into the central or barrier layer.

In the operation of our process, the precoat may be aplied at any time prior to extrusion of the multi-layer barrier coating onto the coated paper. In the preferred embodiment, the polyolefinic precoat and the subsequent multi-layer extrusion are carried out in a single handling of the paper web. This can be easily arranged for continuous operation.

The following examples illustrate some non-limiting embodiments of the invention.

EXAMPLE 1

A 40 pound bleached Southern kraft paper is precoated with polyethylene (density of .917) at 600° F. so as to obtain a .75 mil polyethylene coat. To this surface is extruded at 400° F. a 1 mil layered melt composed of the following:

A .15 mil outer layer of polyethylene (density 0.930, melt index 3.8); a .20 mil layer of copolymer of 72 weight percent ethylene, 28 weight percent vinyl acetate (melt index 3.0); an inner .30 mil layer of saran, comprising 93.75 parts by weight of a copolymer of 85 weight percent vinylidene chloride and 15 weight percent vinyl chloride, 4.50 parts by weight acetyltributyl acetate, 1.00 part by weight of an epoxidized soyabean oil commercially available under the trade designation of Paraplex G–60, and 0.75 part by weight of 4-tertiarybutyl salol; a second .20 mil layer of the ethylene-vinyl acetate copolymer and a second .15 mil outer layer of the polyethylene (density 0.930, melt index 3.8).

EXAMPLE 2

The same coated paper as in Example 1 is prepared except the layered melt is 2 mils thick rather than 1 mil thick. In this example, the outer layers of polyethylene are each .65 mil thick, while the thicknesses of the other layers are the same.

EXAMPLE 3

For comparison, a 1.5 mil thick coating of polyethylene (density .930) is extruded at 600° F. onto a web of 40 pounds bleached Southern kraft. No further coating is extruded.

The coated papers are then tested for gloss, water vapor transmission rate, oxygen transmission rate, adhesion and grease resistance. Gloss measurements are made using a Gardner Multi-Angle Glossmeter. Excellent gloss is obtained with no sign of degradation. Gloss measurements gave the following values:

|  | Coating | |
| --- | --- | --- |
|  | 60° gloss | 85° gloss |
| Example 1 | 85 | 75 |
| Example 2 | 85 | 75 |
| Example 3 | 75 | 80 |

Water vapor transmission rates are determined by the method outlined in TAPPI T–464 M–45 in a Blue M humidity cabinet at 100° F. and 90–95% relative humidity. The oxygen transmission is determined in gas cells by the Standard ASTM Procedure D1434–56T. A .5 mil saran latex coated paper is included for comparison.

| Sample | Density of polyethylene substrate | Oxygen transmission rate cc./24 hr. (100 in.$^2$), 1 atm. | Water vapor transmission rate, gms./24 hr. (100 in.$^2$), 1 atm. |
| --- | --- | --- | --- |
| Example 1 | .917 | 1.4 | .24 |
| Example 2 | .917 | 1.6 | .19 |
| Example 3 | .930 | 200 | .53 |
| .5 mil saran |  | 1.7 | .4 |

The adhesion of Example 1 multi-layer coating to the polyethylene base coat using the hand pull method is very good. The adhesion of Example 2 multi-layer coating to the polyethylene base coat is excellent using the hand pull method.

Grease penetration is tested using the inverted fruit jar technique. Samples of Examples 1–3 are prepared by cutting circular discs of each and placing the coated side down over the top of a fruit jar. The jar contains the grease with a red dye. Greases from animal, vegetable and mineral groups are chosen. The rims of the jars are sealed with an adhesive and sealant. A sample of each example is placed on a rim of a jar so that the coated side is directed into the jar and the lid of the fruit jar without the circular metal disc is tightened over the coating. This permits observation of the grease penetraton through the coating. The fruit jars are inverted and placed in a steam cabinet maintained at 140° F. The evaluation is conducted at this elevated temperature to obtain visible results which indicate the relative room temperature performance for each coating.

GREASE TEST

| Sample | Sperm oil | Time for failure for mineral oil | Peanut oil |
| --- | --- | --- | --- |
| Example 1 | ½–1 day | 2 days | 4–5 days. |
| Example 2 | 5–6 days | 4–13 days | 14–>21 days. |
| Example 3 | ½ day | 2–3 days | 4–5 days. |

The toughness and abrasion resistance of the coated paper as well as the barrier characteristics result in superior low cost packages which are highly attractive. The uses of a material in accordance with the invention are manifold. For example, the freshness of coffee is materially and adversely affected by exposure to oxygen. Such exposure occurs when coffee pouches do not possess gas barrier characteristics capable of excluding oxygen from passing from the atmosphere into the pouch. Coffee is considered unsaleable when the oxygen content in the pouches reaches 4% by volume. Thus, coffee pouches are beneficially prepared in accordance with the invention. A 25 pound high finish bleached kraft paper is pre-coated with a .50 mil coating of 0.921 density polyethylene having a melt index of 3. Extruded onto the coated paper's polyethylene side is a 2 mil thick symmetrical, layered, barrier melt consisting of a .60 mil outer layer of polyethylene (PE) (density 0.921, melt index 3); a .20 mil layer of copolymer of 72 weight percent ethylene, 28 weight percent of vinyl acetate (melt index 3.0) (EVA); an inner .40 mil layer of saran, comprising 93.75 parts by weight of a copolymer of 85 weight percent vinylidene chloride and 15 weight percent vinyl chloride, 4.50 parts by weight acetyltributyl acetate, 1.00 part by weight of an epoxidized soyabean oil commercially available under the trade designation of Paraplex G–60, and 0.75 part by weight of 4-tertiarybutyl salol; a second .20 mil layer of the ethylene-vinyl acetate copolymer; and a second .60 mil outer layer of the polyethylene.

Pouches of this coated barrier paper are fabricated by conventional means to hold approximately 2.5–3 ounces of vending grade fresh coffee. These pouches are about 4 inches wide by 6 inches long plus 0.5 inch at both ends for heat sealing. The coffee is then placed into the pouch, the contents flushed with nitrogen gas to remove the air and the pouch sealed. A plurality of these pouches are thus filled with coffee, sealed and stored at room conditions for periods of from 6 to 13 weeks. After the indicated periods of time have elapsed, selected pouches are examined for oxygen content with the following results:

| Time (weeks): | $O_2$ (volume percent) |
| --- | --- |
| 6 | 1.6 |
| 8 | 1.8 |
| 10 | 2.0 |
| 11 | 2.4 |
| 12 | 3.8 |
| 13 | >4.0 |

Current commercial usage employs a nitro-cellulose coated paper for such packaging of coffee. The usable shelf-life is one week. Saran coated paper has also been tried and found to be unsatisfactory because of pin holing and fracturing of the coating. Thus, the present invention permits the coffee distributor to make much less frequent deliveries, to increase his area of distribution with no increase in delivery force and assures fresher coffee for the customer.

To the same end and with the same success, pouches are fabricated for coffee as described above, and using the same constituents except that the layered barrier melt used is the unsymmetrical one referred to in FIG. 3, wherein the melt comprises a .60 mil outer layer of the PE, a first .20 mil layer of the EVA, the same inner .40 mil layer of the saran, and a second .50 mil layer of the EVA. A .20 mil layer of EVA is sufficient to bind the PE and the saran, but a .50 mil layer of EVA is advantageous for binding the layered melt to the coated paper. This is accomplished in accordance with the invention by splitting the source of resinous material 53 (not shown) so that PE is fed only in cavity 59 and EVA is fed into cavity 58. This EVA merges with the EVA fed into cavity 56 to form an end product .50 mil layer of EVA so that the final configuration is $B_1AB_2C$ with $B_1$=.50 mil EVA, A being the .40 mil saran, $B_2$ being the .20 mil EVA, and C being the .60 PE.

It is understood that the examples given herein are illustrative rather than restrictive and that numerous modifications of the invention can be made without departing from it.

We claim:

1. A composite, layered structure which comprises a substrate layer of paper or paper board, an intermediate adhesion promoting layer of polyolefinic material tightly adhered to said substrate layer, a film over said adhesion promoting layer of polyolefinic material, said film comprising a resinous polyolefin and a resinous barrier layer, said resinous polyolefin being compatible with said adhesion promoting layer and disposed as outer layers on either side of said resinous barrier layer, one of said outer layers being tightly adhered to said adhesion promoting layer, said one outer layer being relatively thinner than said adhesion promoting layer to the extent that it would not adhere to said substrate layer as tightly as said adhesion promoting layer.

2. The structure of claim 1 wherein the thickness of the tightly adhered film is up to about 10 mils.

3. The structure of claim 1 wherein said intermediate adhesion promoting layer of polyolefinic material is polyethylene.

4. The structure of claim 1 wherein said intermediate adhesion promoting layer is a hot melt of approximately the same thickness as said film.

5. The structure of claim 1 wherein the outer layers of the said tightly adhered film are polyethylene.

6. The structure of claim 1 wherein the resinous barrier layer comprises a copolymer of vinylidene chloride and at least one other olefinically unsaturated monomer copolymerizable therewith.

7. The structure of claim 1 wherein the outer layers of the said tightly adhered film are resinous polypropylene.

8. The structure of claim 1 wherein an adhesive layer is disposed adjacent the barrier layer and each of the said polyolefin outer layers.

9. The structure of claim 8 wherein the adhesive is chlorinated polyethylene, a copolymer of ethylene vinyl acetate, a copolymer of ethylene isobutyl acrylate or ethylene-ethyl acrylate.

10. The structure of claim 9 wherein the barrier layer is a polymer having at least 85 weight percent vinylidene chloride copolymerized with another olefinically unsaturated monomer.

11. The structure of claim 10 disposed about coffee in the form of a sealed pouch wherein the outer portion of said pouch is said substrate layer of paper.

12. The structure of claim 10 wherein the tightly adhered film has a thickness of from about ½ to 3 mils.

13. The structure of claim 12 where the outer layer of the tightly adhered film is polyethylene or polypropylene.

14. The structure of claim 8 wherein said intermediate adhesion promoting layer is a hot melt.

15. A composite layered structure which comprises a substrate layer of paper or paper board, an intermediate adhesion promoting layer of polyolefinic material tightly adhered to said substrate layer, a film over said adhesion promoting layer of polyolefinic material, said film comprising a resinous polyolefin, a central resinous barrier layer, and two intermediate adhesive layers, one of said two intermediate adhesive layers disposed adjacent said barrier layer and the resinous polyolefin, the other of said two intermediate adhesive layers disposed adjacent said barrier layer and said applied coating of polyolefinic material, said other layer being relatively thinner than said adhesion promoting layer and tightly adhered thereto, the adherence of said other layer being greater with said adhesion promoting layer than with said substrate layer if applied directly thereto.

16. The structure of claim 15 disposed about coffee in the form of a sealed pouch wherein the outer portion of said pouch is said substrate layer of paper.

(References on following page)

References Cited

UNITED STATES PATENTS

| | | | |
|---|---|---|---|
| 3,075,864 | 1/1963 | Anderson | 161—165 |
| 3,231,411 | 1/1966 | Tyler et al. | 161—254 |
| 3,343,663 | 9/1967 | Seidler | 161—250 |
| 3,370,106 | 2/1968 | Hall et al. | 161—250 |
| 3,370,972 | 2/1968 | Nagel et al. | 117—76(F) |
| 3,445,324 | 5/1969 | Curler et al. | 161—165 |
| 3,446,631 | 5/1969 | Samuels | 161—165 |
| 3,459,582 | 8/1969 | Swerlick | 117—76(F) |

DOUGLAS J. DRUMMOND, Primary Examiner

G. W. MOXON II, Assistant Examiner

U.S. Cl. X.R.

117—76; 161—165, 250, 252, 254

PO-1050
(5/69)

UNITED STATES PATENT OFFICE
CERTIFICATE OF CORRECTION

Patent No. __3,560,227__        Dated __2 February 1971__

Inventor(s) __Jacob Eichhorn and Stanley F. Roth__

It is certified that error appears in the above-identified patent and that said Letters Patent are hereby corrected as shown below:

In Column 3, line 12 change "Moderate" to -- Modern --; in line 17 change "24" to -- 42 --.

Signed and sealed this 28th day of September 1971.

(SEAL)
Attest:

EDWARD M. FLETCHER, JR.　　　　　　　ROBERT GOTTSCHALK
Attesting Officer　　　　　　　　　　Acting Commissioner of Pate